Patented Apr. 13, 1954

2,675,353

UNITED STATES PATENT OFFICE 2,675,353

OIL BASE DRILLING FLUID

Reginald D. Dawson, Glendale, Calif., assignor to Shell Development Company, San Francisco, Calif., a corporation of Delaware No Drawing. Application October 20, 1950, Serial No. 191,309

9 Claims. (Cl. 252—8.5)

This invention relates to the drilling of oil and gas wells and pertains more particularly to the use and composition of improved oil-containing drilling fluids.

Drilling fluids or muds are generally used when drilling wells by the rotary method. These muds are usually pumped down through the drill stem of the rotary rig and around the drill bit, returning to the surface through the annular passage between the drill stem and the well casing.

Prime requisites of a satisfactory drilling fluid are a good gel structure, preferably a substantially thixotropic gel structure, and good plastering or sheath-forming characteristics. That is, the fluid must form on the walls of the borehole a mudsheath effectively preventing any appreciable fluid loss to the formation. Any substantial loss of fluid to the formation is undesirable at any time during the drilling, being especially dangerous and objectionable when drilling through heaving formations such as shale, or when drilling into the producing zone, which may be contaminated and plugged by said fluid.

A further desirable characteristic of a drilling fluid is stability against contamination with salt solutions such, for example, as brines entering the well. Since high borehole temperatures are often encountered in well drilling, it is also desirable that there be no breakdown of the drilling fluid when subjected to elevated temperatures and/or when contaminated with salts such as calcium sulfate. Many oil-base drilling fluids and water-and-oil drilling emulsions, having excellent plastering properties when made up to a light or average weight such as 70 lbs. per cu. ft., lose their plastering properties when made up to a heavier weight. In particular, it has been noted that many oil-base and emulsion drilling fluids incorporating blown asphalt and a rosin or rosin residue soap have excellent plastering properties when mixed to a weight of 70 lbs. per cu. ft. When, however, sufficient weighting materials are added to raise the weight of the fluid to 100 lbs. per cu. ft., a breakdown of the fluid often occurs accompanied by a loss in plastering properties and/or considerable settling of the solid matter from the liquid phase when the fluid is allowed to stand in a well several hours at high temperatures, or in a storage tank for several days at normal temperatures.

It is an object of this invention to provide an improved oil-containing drilling fluid possessing excellent stability and plastering properties at any desired specific weight.

Another object of this invention is to provide heavy oil-containing drilling fluids and emulsions which are neither impaired by high temperatures nor affected by brine contaminations to the same extent as ordinary drilling fluids of the same types.

A further object of this invention is to provide a method for regenerating an oil base drilling fluid which has become contaminated with formation waters, clay, etc., during drilling operations.

Another object of this invention is to provide a water-in-oil drilling emulsion possessing excellent stability against settling when the water phase is present in large amounts, i. e., approaching 50% by volume.

These and other objects of this invention will be understood from the following detailed description of the invention. The term "oil-containing drilling fluid" employed herein and in the appended claims includes water-in-oil emulsions wherein either the aqueous or the non-aqueous fluid component may vary in proportions from one to fifty per cent of the total fluid phase, and oil-base drilling fluids having a base substantially comprising an oil, although it may be noted that these so-called pure oil-base drilling fluids normally contain an amount of emulsified or non-emulsified water, usually formation water, rain water, water from aqueous alkali additives, etc., equal to from one to several per cent of the total fluid phase.

The present invention can be practiced by adding a small quantity (0.25 to 4.0% by weight) of an inorganic silicate bearing organo-substituted ammonium radicals, particularly cationic hydrophobic surface-active radicals, to drilling fluids of the oil base type or of the water-in-oil emulsion type which may or may not contain another emulsifying agent. In accordance with the present invention, drilling fluids or emulsions may also be prepared by adding small quantities of a hydrophobic surface-active ammonia derivative, that is, an organo-substituted ammonia or ammonium compound, for example, dimethyl dihexadecylammonium chloride, particularly a cationic hydrophobic surface-active compound, to an oil-containing drilling fluid or emulsion which also contains colloidal material in the form of an inorganic silicate, preferably a natural inorganic silicate. The addition of the inorganic silicate bearing cationic hydrophobic surface-active radicals to an oil base drilling fluid or emulsion, yields a fluid that forms a thin, impervious mudsheath on the borehole walls. The above oil base emulsions or fluids possess excellent plastering qualities, substantially thixotropic gel structures and exhibit little tendency to settle out when contaminated with formation brines or large quantities of water. Heavy drilling fluids and emulsions incorporating treated inorganic silicates according to the present invention as emulsifying agents, stabilizing agents and/or agents for enhancing the plastering properties of the fluids, can also be used successfully in deep wells or in wells where high temperatures are encountered, as these fluids remain relatively stable at high temperatures.

Substances useful in the preparation of the drilling fluids of the present invention include cation-exchangeable inorganic colloids of which the swelling clays and especially the bentonites are particularly preferred. The exact composition of the complex silicates useful as stabilizers and/or emulsifiers in the present compositions is not subject to precise description, since they vary widely from one natural deposit to another. As far as present knowledge permits, they may be described as complex, inorganic silicates such as aluminum silicates, magnesium silicates and barium silicates and the like, containing, in addition to the silicate lattice, varying amounts of cation-exchangeable groups generally regarded as metallic oxide radicals. Some of these materials may be considered as aluminates as well as silicates. The list given hereinafter contains examples of naturally-occurring clays particularly suitable for use in the present compositions: bentonites, such as Wyoming bentonite, montmorillonite, beidillite, nontronite, hectorite and saponite, vermiculite, zeolites, etc.

When the inorganic silicates are pretreated for use as stabilizing and/or emulsifying agents for use in drilling fluids, the silicate is preferably dispersed in water to form a hydrosol. Upon dispersion, the cation-replaceable sites become available for cation exchange, which is generally effected with hydrophobic surface-active ammonia derivatives, that is, organo-substituted ammonia and ammonium compounds, particularly cationic surface-active water-repelling (or hydrophobic) agents, including quaternary ammonium salts or their hydroxides, high molecular weight salts of high molecular weight amines with water-soluble organic acids, the amino or ammonium radicals thereof bearing at least one hydrocarbon radical (preferably alkyl) having 12-30 carbon atoms. Other miscellaneous types of cationic substances may be employed including condensation products of a polymeric nature derived from the condensation of ammonia or low molecular weight primary or secondary amines with acrolein or its analogs.

The treatment of the silicate hydrosol with the cationic materials such as those listed hereinbefore results in the precipitation of a hydrogel hereinafter referred to as an "aminogel." Addition of the cationic materials results in replacement of available cations such as hydrogen, sodium and potassium and the like with substituted amonium ions exhibiting hydrophobic properties. The water solution of the aminogel may be admixed directly with an oil in forming a drilling emulsion, or, alternatively, the aminogel precipitate may be filtered and dried before adding it directly to an oil-containing drilling fluid or emulsion.

A sufficient ratio of amine to silicate must be employed to provide the resulting aminogel with an oleophilic character in order to permit ready dispersion later in the drilling fluids. For the present purpose, it has been found that the clays should bear at least 30% by weight of hydrophobic surface-active radicals and preferably bear between 30 and 75% by weight of said radicals, while optimum results are obtained when using from 40 to 65% of the radicals based upon the weight of the slicates. The mixtures should be stirred or otherwise agitated during introduction of the surface-active agent so as to effect uniform distribution and ion replacement throughout the gel.

In the treatment of natural clays, as well as the synthetic materials, a preferred category of surface-active agent comprises the quaternary ammonium bases and salts broadly described as tetra-hydrocarbon ammonium hydroxides and halides, preferably the tetra-alkyl ammonium hydroxides and halides. At least one, and preferably two, of the alkyl radicals has a chain length of at least twelve carbon atoms, and optimum results are obtained if two of the alkyl radicals have chain lengths between fourteen and eighteen carbon atoms. Representative preferred substances are dimethyl dihexadecylammonium chloride and dimethyl dioctadecylammonium chloride, and mixtures thereof.

The following list of cationic surface-active agents gives typical species which may be employed for providing the recited silicates with hydrophobic surfaces.

*Cationic surface-active water-repelling agents— Quaternary ammonium salts*

Trimethyl dodecylammonium chloride
Trimethyl tetradecylammonium chloride
Triethyl hexadecylammonium chloride
Triethyl octadecylammonium bromide
Dimethyl dihexadecylammonium chloride
Dimethyl cetyl lauryl ammonium chloride
Dimethyl lauryl stearyl ammonium chloride
Diethyl dioleyl ammonium chloride
Dimethyl diheptadecylammonium chloride
Dimethyl octadecyloctadecenylammonium chloride Drilling fluids may comprise several components which commonly include a suspending component or medium, a suspended component, a plastering agent and an emulsifying and/or stabilizing agent. The suspending medium in the case of an emulsion of the present invention is formed of oil and water, and in the case of an oil-base drilling fluid oil alone is used although small amounts (e. g., 5%) of water may be present, as stated above. The oil in either case may be in the form of any suitable non-aqueous liquid such as a mineral crude oil, diesel oil, fuel oil, kerosene, stove oil and the like. A plastering agent such as a blown or polymerized asphalt must be incorporated in the emulsion to seal the porous walls of the borehole by forming a sheath of mud thereon. The blown asphalt is preferably added to the oil phase prior to emulsification in relatively small quantities such as from 5 to 25% on the weight of the oil phase. A suspended component in the form of a weighting material is generally added in order to improve plastering to some extent and to add weight to the drilling emulsion to overcome any formation pressures encountered during drilling operations. Weighting materials commonly used are crushed oyster shells, barites, hematite, magnetite, etc. However, for the purposes of the present invention, the preferred weighting materials are those finely ground or powdered weighting materials which have a greater tendency to be wetted by oil than by water. The weighting material may constitute a substantial portion by weight of the drilling emulsion, e. g., in the range of 20 to 70 per cent. In the case of drilling emulsions, 0.5% to 5% of a suitable emulsifying agent may be used also, e. g., soaps of fatty acids, resin acids, tall oil and the like. In general, excellent emulsions may be obtained with most of these soaps when about 1 per cent (by weight) of the emulsifier is used. In drilling fluids incorporating large amounts of a treated clay or bentonite or in heavy drilling fluids made according to the present invention, it may be necessary to add small (0.5 to 5%) quantities of a viscosity reducing agent such as tall oil.

Drilling fluids weighing from 75 to 150 lbs. per cu. ft. and prepared according to the present invention are found to have excellent plastering properties at all times, even when subjected to high temperatures or contaminated with formation salts, whereas, heavy drilling fluids, for example, heavy drilling emulsions incorporating blown asphalt and a polyvalent metal soap of resin or resin residue, normally break down and lose their plastering properties, especially when subjected to high temperatures or when contaminated with salts such as calcium sulfate. Additionally, most drilling emulsions have a tendency to break down when more than 20 per cent water is incorporated in them. However, drilling emulsions prepared according to the present invention retain their desired characteristics when water is incorporated therein in quantities as large as 40 per cent by volume of the fluid phase. The following examples illustrate the improvements obtained by application of the present invention.

EXAMPLE I

In drilling oil wells with a 100 lb. per cubic foot base drilling fluid comprising an oil, blown asphalt and a weighting material, the drilling fluid often becomes contaminated with formation waters, clay and many other inorganic materials. When small amounts (5 to 15%) of water have become mixed with the drilling fluid, a complete breakdown of the fluid occurs causing it to be discarded with loss of the gel and suspending properties of the fluid. Rather than discarding the water-contaminated drilling fluid, it is readily regenerated for continued use by admixing therewith a quaternary ammonium compound, for example, dimethyl dioctadecylammonium chloride in relatively small quantities such as from 0.5 to 2.0% on the weight of the drilling fluid.

EXAMPLE II

To an oil base mud comprising an oil, blown asphalt and a weighting material, there was added 1% of a quaternary ammonium compound, for example, dimethyl dihexadecylammonium chloride and sufficient clay which contained colloidal material equal to 1% by weight of the drilling fluid. The components were thoroughly mixed and yielded a drilling fluid exhibiting good plastering properties (0.25 cc. per sq. cm. per hour at 275° F. and 500 p. s. i.) as well as a satisfactory gel strength and viscosity. Of special note was the fact that when a sample of the drilling fluid was heated to 300° F. and allowed to settle for three days, a top settling of only 17% occurred. In samples of similar drilling fluid where the addition of a quaternary ammonium compound and a clay is omitted, a top settling of 30 to 35% takes place.

EXAMPLE III

A 100 lb. per cu. ft. water-in-oil emulsion was prepared comprising 10% by volume of water emulsified in oil, blown asphalt, a weighting agent and 3% colloidal such as P34 clay which had been previously treated with a quaternary ammonium compound, for example dimethyl dioctadecylammonium chloride. All percentages given above are percentages by weight of the total weight of the emulsion. An excellent drilling fluid was obtained which was exceedingly stable, having a top settling reading of only 9% after standing for three days at a temperature of 300° F. The same drilling emulsions not having the quaternary ammonium compound added gave top settling tests of 40 to 45%.

EXAMPLE IV

A series of satisfactory 100 lb./cu. ft. drilling emulsions were prepared containing 30% by weight stove oil, 6.1% water, 57% weighting materials, 6.3% blown asphalt and varying amounts of bentonite treated with a quaternary ammonium compound, for example, dimethyl dioctadecylammonium chloride.

| Sample | Percent Treated Bentonite | Viscosity, Grams, Stormer, at 120° F. | Gel Strength, Stormer | | Filter Loss, cc./sq. cm./hr. at 275° F. and 500 p. s. i. |
|---|---|---|---|---|---|
| | | | 0 Min. | 10 Min. | |
| 5-A | 0.25 | 122 | 7 | 7 | 0.21 |
| 5-B | 0.50 | 150 | 7 | 7 | 0.20 |
| 5-C | 0.75 | 220 | 8 | 11 | 0.20 |
| 5-D | 1.16 | 338 | 9 | 21 | 0.21 |

All samples had satisfactory gel strengths and viscosities. The filter loss had a very small figure of 0.21 c. c.

EXAMPLE V

Substantially similar results were obtained on 75 to 100 lb. oil base drilling fluids as had been obtained from the water-in-oil emulsion of Example 4.

| Sample | Weight, lbs. | Stove Oil, percent | Blown Asphalt, percent | Weighting Material, percent | Treated Bentonite, percent |
|---|---|---|---|---|---|
| 6-A | 75 | 43.2 | 11.0 | 42.8 | 1.0 |
| 6-B | 100 | 33.3 | 7.1 | 58.6 | 1.0 |

| Sample | Viscosity, Grams, Stormer | Gel Strength, Grams, Stormer | | Filter Loss, cc./sq. cm./hr. at 275° F. and 500 p. s. i. |
|---|---|---|---|---|
| | | 0 Min. | 10 Min. | |
| 6-A | 160 | 6 | 8 | 0.21 |
| 6-B | 185 | 7 | 10 | 0.21 |

EXAMPLE VI

A heavy drilling emulsion were prepared weighing 130 lbs. per cu. ft. and containing 18.1% stove oil, 2.3% blown asphalt, 4.6% water, 71% weighting materials and 0.5% treated bentonite. The gel and plastering properties of the resultant emulsion were good, but the viscosity was much too high at 1000 g. Stormer. The addition of 2% of free tall oil, however, satisfactorily reduced the viscosity to 390 g. Stormer at 120° F. Gel strengths of 8 and 11 g. Stormer and a plastering test filter loss of 0.234 cc. per sq. cm. per hour at 275° F. and 500 p. s. i. were maintained even after the emulsion was contaminated with 1.5% of calcium sulfate, which causes many drilling emulsions to break down.

EXAMPLE VII

Two 10% by volume water-in-oil drilling emulsions and one 40% by volume water-in-oil emulsion were prepared incorporating a resin soap emulsifier together with a small amount of bentonite treated with a quaternary ammonium compound. These emulsions were compared with a 10% by volume water-in-oil emulsion containing a resin soap emulsifier but without any treated bentonite. The compositions of the emulsions by weight are as follows: The gel strengths, viscosities and plastering properties of all the emulsions were similar and quite good. The emulsions containing treated bentonite all possessed excellent stability, the 10% emulsions showing no top settling at all and the 40% emulsion showing only 6% top settling after 20 hours at 300° F. On the other hand, the 10% emulsion which did not contain any treated bentonite had 37% top settling, indicating that it was a very poor drilling emulsion due to its lack of stability. Additionally, the emulsions incorporating treated bentonite retained their excellent properties after being contaminated with 1.5% calcium sulfate.

The invention claimed is:

1. An oil-containing drilling fluid for wells, comprising a substantial quantity of a mineral oil, a finely divided solid material dispersed in said fluid for weighting said fluid to at least 75 lbs. per cu. ft., and a minor amount of a tetra-alkyl ammonium halide having at least one of the alkyl radicals with a chain length of at least 12 carbon atoms, said minor amount being sufficient to stabilize the drilling fluid and maintain it at a drilling viscosity.

2. An oil-containing drilling fluid for wells, comprising a substantial quantity of a mineral oil, a finely divided solid material dispersed in said fluid for weighting said fluid to a weight of from 75 to 150 lbs. per cu. ft., and minor amount of a clay and a tetra-alkyl ammonium halide having at least one of the alkyl radicals with a chain length of at least 12 carbon atoms, said minor amount being sufficient to stabilize the drilling fluid and maintain it at a drilling viscosity.

3. An oil-containing drilling fluid for wells, comprising a substantial quantity of a mineral oil, a finely divided solid material dispersed in said fluid for weighting said fluid to between 75 and 150 lbs. per cu. ft., and minor amount of bentonite and a tetra-alkyl ammonium halide having at least one of the alkyl radicals with a chain length of at least 12 carbon atoms, said minor amount being sufficient to stabilize the drilling fluid and maintain it at a drilling viscosity.

4. An oil-containing drilling fluid for wells, comprising a substantial quantity of an oil, a plastering agent, a finely divided solid material dispersed in said fluid for weighting said fluid to between 75 and 150 lbs. per cu. ft., and 0.25 to 4.0% by weight of a colloidally dispersed clay, said clay having been subjected to ion exchange so that it contains at least 30% by weight of a quaternary ammonium ion having at least one alkyl radical with a chain length of at least 12 carbon atoms.

5. An oil base drilling fluid for wells, comprising a predominant quantity of oil, blown asphalt, a finely divided solid material dispersed in said fluid for weighting said fluid to between 75 and 150 lbs. per cu. ft., and a minor amount of bentonite, said bentonite having been subjected to ion exchange so that it contains at least 30% by weight of a quaternary ammonium ion having at least one alkyl radical with a chain length of at least 12 carbon atoms, said minor amount being sufficient to stabilize the drilling fluid and maintain it at a drilling viscosity.

6. A water-in-oil drilling emulsion for wells, comprising a predominant quantity of oil, blown asphalt, a finely divided solid material dispersed in said emulsion for weighting said fluid to between 75 and 150 lbs. per cu. ft., 0.5 to 5.0% by weight of an emulsifying agent, and 0.25 to 4.0% by weight of bentonite, said bentonite having been subjected to ion exchange so that it contains at least 30% by weight of a quaternary ammonium ion having at least one alkyl radical with a chain length of at least 12 carbon atoms.

7. A water-in-oil drilling emulsion for wells, comprising a predominant quantity of oil, blown asphalt, a finely divided solid material dispersed in said emulsion for weighting said fluid to between 75 and 150 lbs. per cu. ft., 0.5 to 5.0% by weight of bentonite, said bentonite having been subjected to ion exchange so that it contains at least 30% by weight of a quaternary ammonium ion having at least one alkyl radical with a chain length of at least 12 carbon atoms.

8. A water-in-oil drilling emulsion for wells, comprising oil, from 10 to 40 per cent by volume of water emulsified therein, blown asphalt, a weighting agent dispersed in said emulsion for weighting said emulsion to between 75 and 150 lbs./cu. ft., from 0.4 to 5.0% by weight of a polyvalent metal soap of a resin acid as an emulsifying agent, and 0.25 to 4.0% by weight of bentonite, said bentonite having been subjected to ion exchange so that it contains at least 30% by weight of a quaternary ammonium ion having at least one alkyl radical with a chain length of at least 12 carbon atoms.

9. A water-in-oil drilling emulsion for wells, comprising a predominant quantity of oil, blown asphalt, a finely divided solid material dispersed in said emulsion for weighting said fluid to between 75 and 150 lbs. per cu. ft., 0.5 to 5.0% by weight of an emulsifing agent, 0.5 to 3.0% by weight of tall oil, and 0.25 to 1.0% by weight of bentonite, said bentonite having been subjected to ion exchange so that it contains at least 30% by weight of a quaternary ammonium ion having at least one alkyl radical with a chain length of at least 12 carbon atoms.

References Cited in the file of this patent

UNITED STATES PATENTS

| Number | Name | Date |
|---|---|---|
| 2,099,825 | Rolshausen et al. | Nov. 23, 1937 |
| 2,265,759 | Lawton et al. | Dec. 9, 1941 |
| 2,350,154 | Dawson et al. | May 30, 1944 |
| 2,461,483 | Self | Feb. 8, 1949 |
| 2,531,812 | Hauser | Nov. 28, 1950 |